United States Patent
Barriere et al.

[11] 3,717,874
[45] Feb. 20, 1973

[54] SURVEILLANCE DOPPLER RADARS

[75] Inventors: Georges Jean Joseph Barriere, Mesnil-Saint-Denis; Michel Rene Joseph Dalbera, Chatillon-Sous-Bagneux, both of France

[73] Assignee: International Standard Electric Corporation, New York, N.Y.

[22] Filed: Sept. 8, 1971

[21] Appl. No.: 178,665

[30] Foreign Application Priority Data

Sept. 10, 1970  France..........................7032847

[52] U.S. Cl.................343/7 ED, 343/7.3, 343/16 M
[51] Int. Cl. ..............................G01s g/14, G01s 9/22
[58] Field of Search....................343/7 ED, 7.3, 16 M

[56] References Cited
UNITED STATES PATENTS

| | | | |
|---|---|---|---|
| 2,831,969 | 4/1958 | Jankowski | 343/16 M |
| 3,177,484 | 4/1965 | Case, Jr. et al. | 343/7 ED |
| 3,249,934 | 5/1966 | Hague | 343/7.3 |
| 3,550,126 | 12/1970 | Van Hijfte et al. | 343/7.3 X |

Primary Examiner—Malcolm F. Hubler
Attorney—Cornell Remsen, Jr. et al.

[57] ABSTRACT

This invention relates to a monopulse coherent doppler radar system for use at the end of a runway for detecting moving targets on the runway and vicinity of said runway. A multiplicity of range gates and threshold circuits define contiguous range increments on the runway. When a target is detected, a light signal indicates the proper range increment.

2 Claims, 7 Drawing Figures

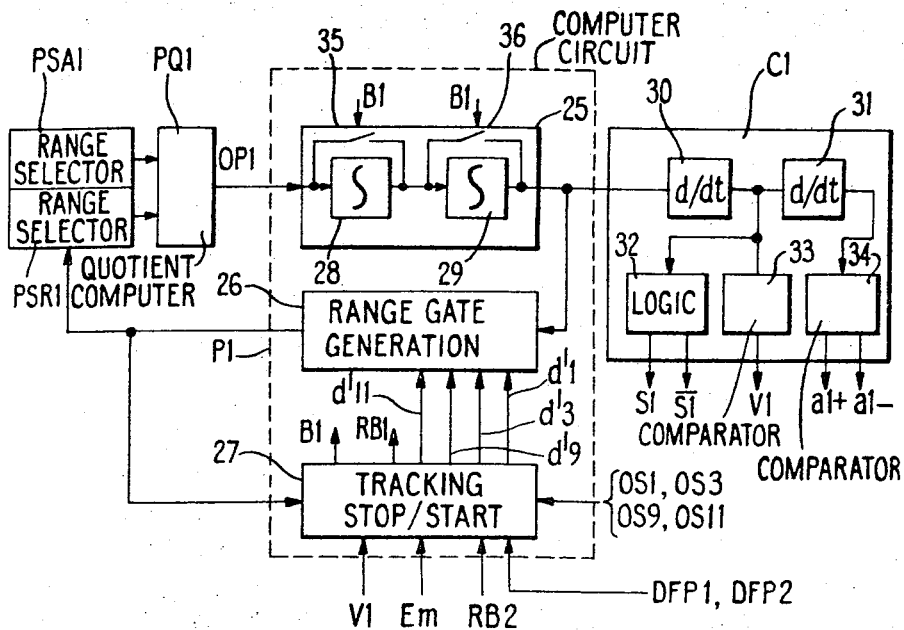
FIG.4
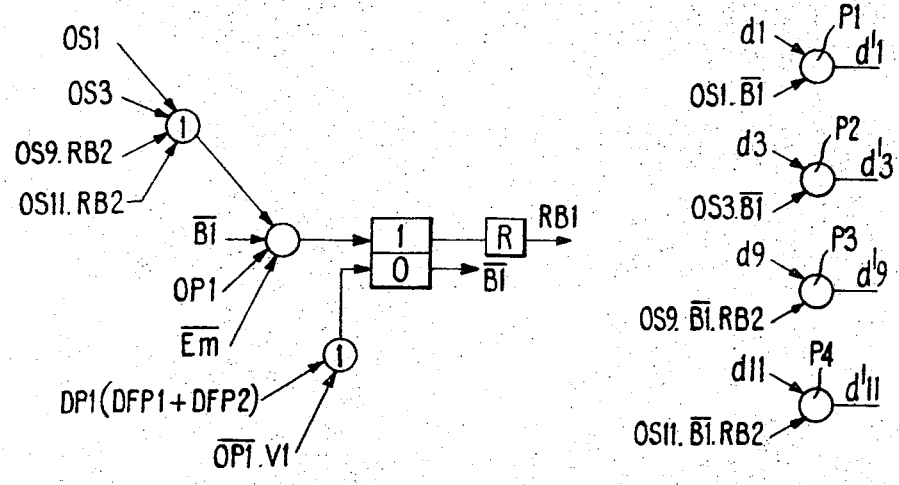
FIG.6
FIG.5

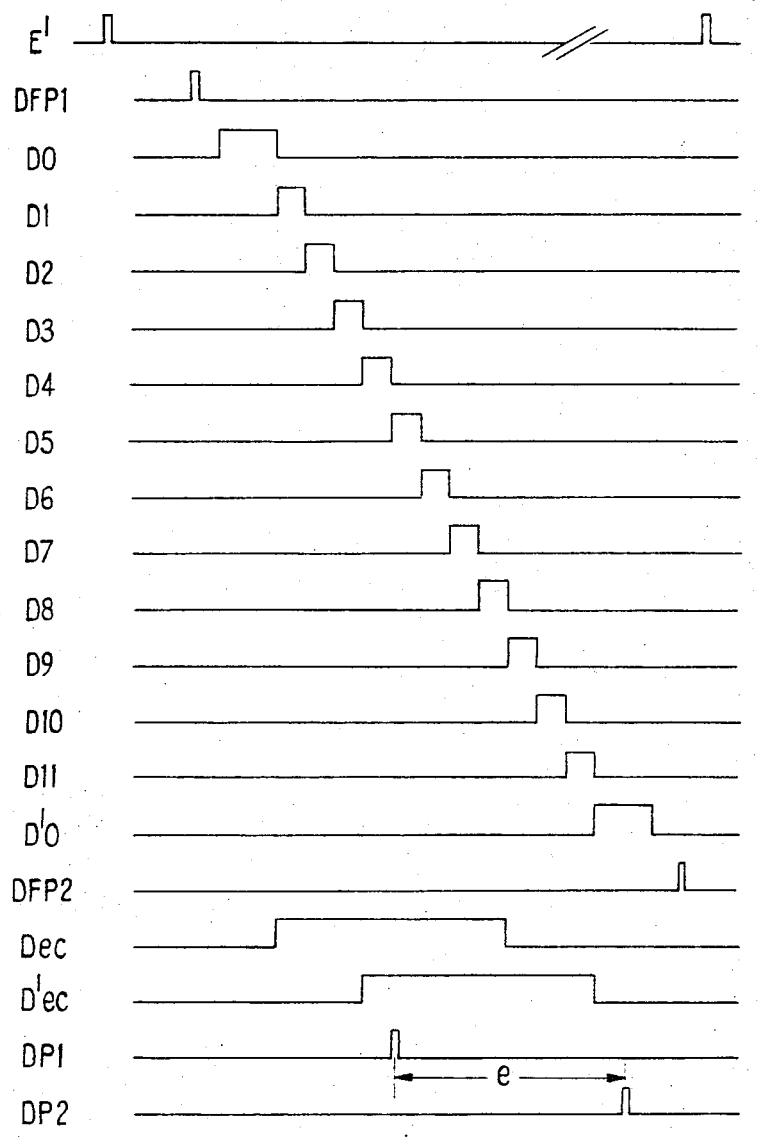

SURVEILLANCE DOPPLER RADARS

BACKGROUND OF THE INVENTION

The present invention relates to improvements in simultaneous cross beam coherent doppler radars designed for the surveillance of an area comprising, for example, an airport runway and approaches thereof.

Airspace surveillance in the vicinity of an airport is provided by radars, technical characteristics of which are fitted to the wanted goal. There are long-range surveillance radars, close terminal area radars, approach radars, etc. Such a surveillance makes it possible, together with voice radio communications with planes flying in the controlled area, to ensure safety for the planes, especially in bad weather operations. Those radars whose information are handled by ground controllers are supplemented by systems whose information is handled by the pilot and the navigator. Such systems are namely radio-navigation systems such as radiobeacons and instrument landing systems (ILS). The latter systems enable the pilot to fly down along a glide path which leads the plane to the runway input at a very low altitude $h$. Therefore, those instrument landing systems require a minimum vertical visibility distance theoretically equal to the plane altitude $h$ when approach operations are completed. The landing is then made in a direct visual condition which presumes there is a minimum horizontal visibility distance available to the pilot so that he can drive the plane on the runway and avoid any obstacle on the runway. There are more sophisticated landing systems which reduce the minimum vertical visibility distance and which, sometimes, cancel it. However, so far the minimum horizontal visibility distance has not been reduced. It can be reduced by surveying the runway so as to detect any intrusion which may constitute a hazard when a plane is taking off or landing.

Runway surveillance devices, which have up to now been proposed, require buildings around the runway, which buildings are inconvenient, of little reliability and costly.

SUMMARY OF THE INVENTION

It is an object of the present invention to provide an airport runway surveillance device which permits detection of any obstacle within an area centered around the runway without requiring any building around said runway.

According to a broad aspect of the present invention there is provided an area surveillance device wherein sum and difference signals are provided by two aerials and sum and difference channel phase discriminators, comprising a plurality of pairs of range selectors, each selector pair processing sum and difference signals returned from a range interval, a plurality of deviation computers coupled to said plurality of range selectors, each for receiving the output signals from one range selector pair and providing signals whose amplitude is proportional to the deviation between a moving target and the axis of said aerials along the runway, a plurality of threshold circuits coupled to said plurality of deviation computers for receiving said deviation computer output signals, means coupled to the outputs of said plurality of threshold circuits for range tracking said moving target, means coupled to the outputs of said means for range tracking for generating speed signals and acceleration direction signals, means coupled to said threshold circuits for generating alarm signals, and an alarm signal display unit.

Other objects, features and advantages of the present invention will be better understood from the following detailed description taken in conjunction with the accompanying drawings, in which:

BRIEF DESCRIPTION OF THE DRAWINGS

FIG. 4 shows a block diagram of a range tracking circuit to which are associated circuits according to the present invention;

FIG. 5 shows the logic circuit determining the initial range of the tracking;

FIG. 6 shows the logic circuit performing closing or opening of the tracking loop; and FIG. 7 shows wave forms of signals appearing at each radar repetition period.

DESCRIPTION OF THE PREFERRED EMBODIMENT

The invention will hereafter be described with respect to airport runway surveillance; however, it also applies to road surveillance, road junction surveillance and, in general, to any area or volume surveillances.

Figure 1:
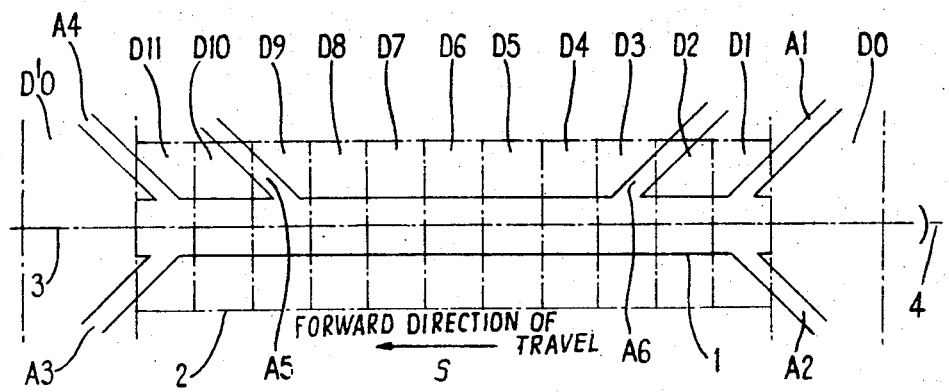
FIG. 1 shows an airport runway and inputs or exits thereof.

FIG. 1 shows a very simplified scheme of an airport runway 1 and taxiways A1–A6. Obviously, for safety reasons, only the plane which has to take off or land is to be on or over the runway to the exclusion of any other obstacle.

Also obviously, other vehicles (planes on runway inputs or outputs, service vehicles etc.) must be far enough from the used runway, which defines a safety zone 2 surrounding the runway 1.

For surveying any vehicle movement inside the safety zone 2, it is proposed to utilize a simultaneous cross beam coherent doppler radar better known under the name of monopulse coherent doppler radar. The serial 4 of this radar is located at one end of the runway 1, outside thereof and close to axis thereof. The aerial 4 is fixed and its beam is pointed toward the runway so as to entirely cover it. In FIG. 1, it is assumed that the aerial axis is the same as the runway axis.

Figure 2:
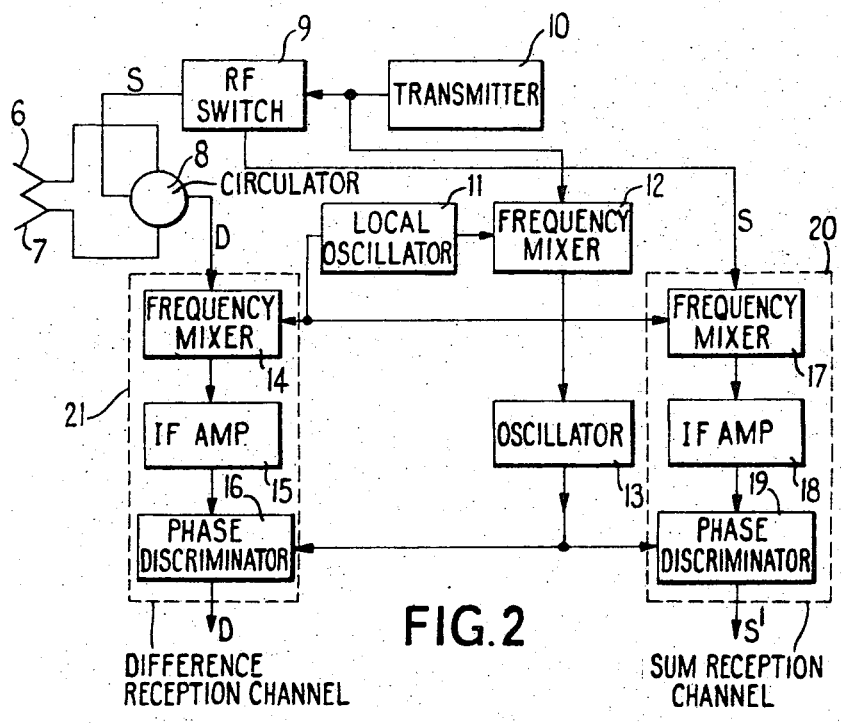
FIG. 2 shows a block diagram of a monopulse coherent doppler radar.

It will be noted that a monopulse radar is generally used to make azimuth and/or site tracking and that it is necessary, for each of those angular coordinates, to measure the value and the direction of the angular deviation between the aerial axis and the target direction. For this purpose, a monopulse radar of the coherent type with amplitude comparison comprises, as shown in FIG. 2, two primary sources 6 and 7 illuminating the same aerial and which are located so that their radiation patterns are overlapping. Amplitudes of signals received on the two primary sources are respectively added in phase and in phase opposition in the circulator 8 so that the obtained sum signal S and difference signal D are phased for a certain sign of the deviation and in phase opposition for the opposite sign.

Those signals are respectively amplified in a sum reception channel 20 and in a difference reception channel 21, each channel comprising a frequency mixer 14 (or 17), an intermediate frequency amplifier 15 (or 18) and a phase discriminator 16 (or 19). The reference signals applied to the phase discriminators 16 and 19 are provided by an oscillator 13 whose output signal is in fixed predetermined phase relationship with the transmitted pulse phase. For this purpose, a small part of the radio frequency signal provided by the transmitter 10 during the radar pulse is applied to the frequency mixer 12 which also receives a signal from the local oscillator 11. The IF pulse outgoing from the frequency mixer 12 is, at the beginning of each radar repetion period, used to trigger operation of the oscillator 13. At each repetition period, the oscillator 13 is then started as previously stated, then stopped before the beginning of the next repetition period. Such an oscillator is often called coherent oscillator. The rectangle 9 shows a radio frequency switch or duplexer circuit which is mounted in the sum channel so as to switch the transmitted pulse to the primary sources or to switch the signals received on the sum terminal to the sum reception channel 20.

Output signals from the circuits 20 and 21, and more particularly from the phase discriminators 16 and 19, are for example applied to a circuit which performs the operation D/S, and provides a signal the amplitude of which is substantially proportional, for small deviations, to the deviation amplitude and the polarity of which depends on the deviation sign.

Figure 3:
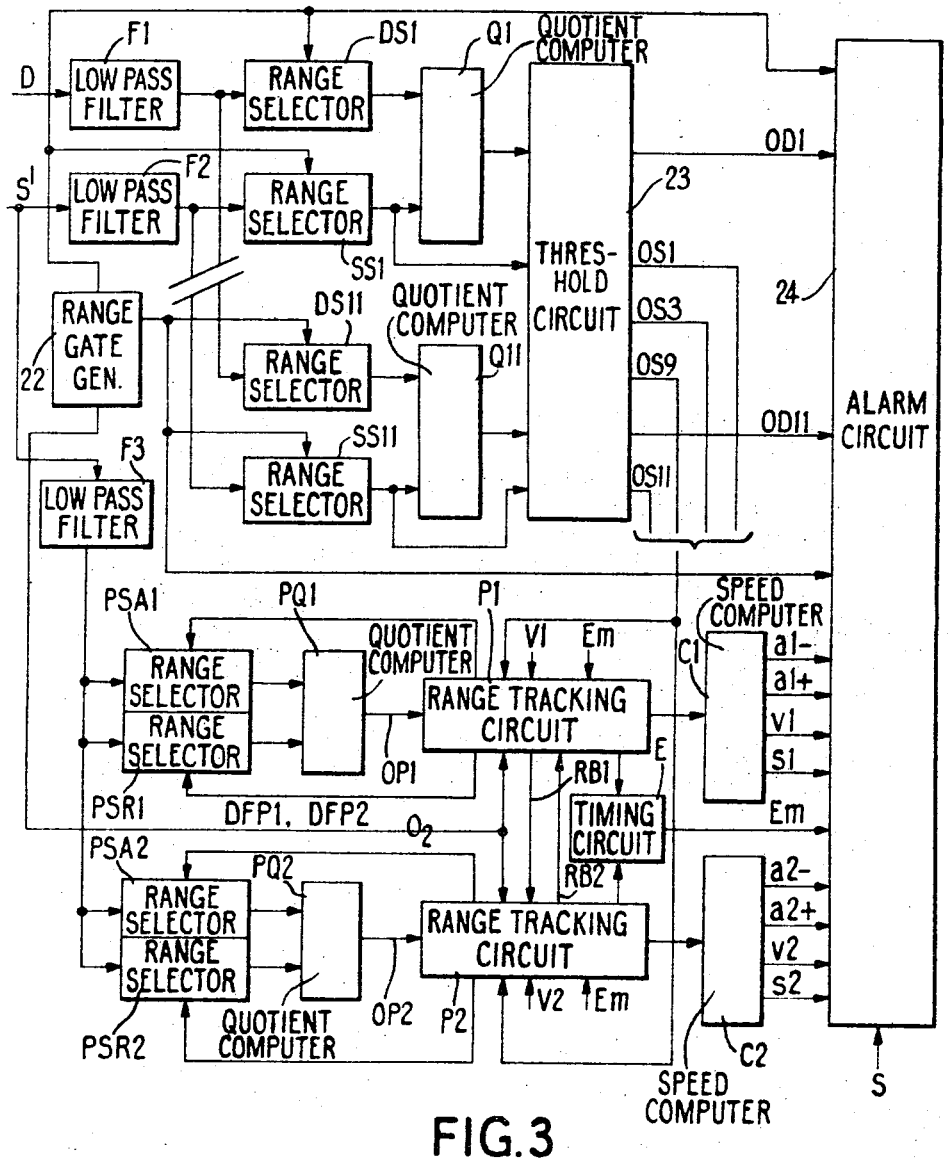
FIG. 3 shows a block diagram of the sum and difference signal handling device according to the invention.

The FIG. 3 shows a specific embodiment of a circuit for handling output signals D and S' of the phase discriminators 16 and 19 shown in FIG. 2 Such a handling circuit comprised lowpass filters F1, F2 and F3, range selectors DS1–DS11 SS1–SS11, PSA1, PSR1, PSA2 and PSR2, a range gate generator 22, quotient computer circuits Q1–Q11, PQ1 and PQ2, a threshold circuit 23, range tracking circuits P1 and P2, circuits C1 and C2 for computing tracked target speed and acceleration, the said circuits providing acceleration direction signals (a1−, a1+, a2−, a2+), null speed signals (V1, V2), a signal (S1, S2) meaning if the tracked target is taking off or landing and a logical circuit 24 for generating alarm signals and lamp lighting signals.

The signals D and S' are, via the low-pass filters F1 and F2, applied to range selectors DS1-DS11 for the signal D, and range selectors SS1-SS11 for the signal S', the range selectors being opened by signals provided by the generator 22. One signal from the generator 22 is applied to both selectors of a pair of selectors as DS1 and SS1 and defines a range interval located at a distance from the radar defined by a signal occurrence time within a radar repetition period. This range selector opening signal has a repetition frequency equal to the radar repetition frequency.

The opening signal applied to the next pair of selectors (DS2, SS2) is identical to the one applied to the pair (DS1, SS1) but it is shifted in time so as to define the next adjacent range interval. Thus, the selector series define adjacent range interval series D1–D11 shown in the FIG. 1, except that their bearings are only limited by the aerial beam width.

Output signals of a pair of selectors are applied to a circuit Q computing the quotient D/S'. The circuit Q may be of any known type. The circuit Q output signal amplitude is proportional to the angular deviation between the moving target located within the range interval and the aerial axis.

Quotient computer circuit output signals and channel S' selector output signals are applied to the circuit 23 which is an analog-to-digital converter comprising namely threshold circuits permitting to angularly limit the range intervals D1–D11. It is clear that threshold values are different from one range interval to the next one and that they are not symmetrical for one range interval if the aerial axis is not the same as the runway axis or if the range intervals are not symmetrical with respect to the aerial axis. When the quotient signal is within the range defined by the two thresholds, that means that there exists a moving obstacle within the corresponding range interval and consequently the circuit 23 provides a logical signal OD1–OD11 according to the concerned range interval.

The circuit 23 also comprises electronic gates which are passing for the sum channel signal OS only if there is a corresponding signal OD. Those signals are called OS1–OS11. Indeed, as it will be shown by reference to the FIG. 5 and 6 only the signals OS1, OS3, OS9 and OS11 are used. Such signals are logical signals and are not analog signals.

The sum channel signal is, via the low-pass filter F3, applied to two tracking devices. The output signals of a pair of selectors PSA1, PSR1 (or PSA2, PSR2) are applied to a circuit PQ1 (or PQ2) which makes the quotient thereof, such quotient signal OP1 (or OP2) having an amplitude proportional to the deviation which exists between the echo middle and the common side of the two tracking range gates. The deviation signal is applied to the circuit P1 (or P2) which moves the tracking range gates so that they are centered on the tracked echo. Such a tracking device is otherwise known and principle thereof is for example disclosed in the pages 189 and 190 of the book entitled "introduction to Radar Systems" by Merrill I. Skolnik published in 1962 by McGraw-Hill Book Company. However, regarding the known devices, the present tracking device comprises additional circuits making it possible to lock the tracking on a target detected in a particular range interval such as one of the intervals D1, D3, D9 and D11 which correspond to taxiways, to stop it when the target has a speed lower than a certain value for landing or when the target goes beyond certain limits on both sides of runways ends. Those additional circuits will be described with more details in relation with the following figures.

The circuits C1 and C2 are identical and enable respectively to elaborate signals a1−, a1+ or a2−, a2+, said signals giving the direction of the tracked target acceleration. They also provide respectively the signal V1 and the signal V2 which characterize the fact that the speed is lower than a predetermined value, and the signal S1 and the signal S2 which characterize the type of movement performed by the tracked target, either landing $\overline{S1}$ or taking off S1. As it will be shown hereafter, all those signals are obtained from the tracking loop signal.

Those signals as well as signals OD1–OD11 and signals provided by the range gate generator 22 are applied to the circuit 24 which performs a certain number of logical functions on the said signals in order to provide therefrom a certain number of alarm signals and lamp lighting signals. Some important logical functions will be explained hereafter with more details in relation with the table 1, but it will be understood that designs of other logical functions are possible by mean skilled in the art without being beyond the scope of the present invention.

The circuit 22 of the FIG. 3 is a pulse generator which, during each repetition period, provides pulses which define range intervals along the runway, for example the range intervals D1–D11 (FIGS. 1 and 7). It also provides further pulses which define the zone DO having for example a length of 500 meters comprised between the interval D1 and a point close to the radar 4, a zone D'O also of 500 meters beyond the interval D11, a zone DFP1, called runway end zone, between the radar and D1 beyond which any tracking is stopped, a symmetrical runway end zone DFP2, a zone Dec involving the intervals D1–D8 and lastly a zone D'ec involving the intervals D4–D11. The relative positions of those pulses within transmitted pulse E' repetition period are shown in the FIG. 7. The FIG. 7 also shows tracking range gates DP1 and DP2 which are in any position whatever when the tracking loops are closed.

It will be noted that the optimum duration of a range gate is the one of a transmitted pulse which is not the case for the wave forms shown in the FIG. 7. If such an optimization is wished, each interval D1–D11 will be made of elementary zones each of which will correspond to the transmitted pulse duration and there will be as many range selector pairs as elementary zones. By grouping output wires of several selectors corresponding to adjacent elementary zones, the intervals DO, D'O, D1–D11 will be obtained, these intervals having possibly different lengths.

The circuit E of FIG. 3 is a circuit for measuring the time interval $e$ between the two tracking pulses DP1 and DP2 which provides a signal Em when $e$ is shorter than a predetermined value. For example, it may consist in a comparator of two voltages representing the positions of the pulses DP1 and DP2 with respect to the transmitted pulse position.

The FIG. 4 shows a simplified scheme of the circuits P1 and C1 of the FIG. 3. The circuit P1 comprises a computer circuit 25 for computing the tracked target range with respect to the initial tracking point, a tracking range gate generator 26, a logical circuit 27 providing tracking start signal and tracking stop signal. The circuit 25 is mainly made of two integrator circuits 28 and 29, said integrators being possibly short-circuited via two switches 35 and 36 which are closed during the signal $\overline{B1}$.

The circuit C1 comprises two differentiator circuits 30 and 31, comparator circuits 33 and 34 and a logic circuit 32 for determining what type of movement is performed by the plane; landing or taking off. It is clear that through a first differentiation of the signal provided by the circuit 25, a signal is obtained which is proportional to the tracking range gate speed, i.e. the tracked target speed. This speed signal is applied to a comparator circuit 33 which provides a signal V1 when the absolute speed value is lower than a predetermined value. The signal V1 means, for example, that the plane which is landing has just stopped and, therefore, that the tracking may be discontinued. The speed signal is applied to a second differentiator circuit 31 which provides a signal proportional to the echo acceleration. Then a comparator circuit 34 provides two signals, one al— meaning that the tracked target acceleration is decreasing and the other one al+ meaning that the tracked target acceleration is increasing. The circuit 32 is a sampling circuit for sampling a certain time, for example one second, after the tracking loop is closed, the speed signal and for comparing the sampled amplitude to a predetermined value, said predetermined value corresponding to a speed which is higher than the speed of any plane taking off and lower than the speed of any plane which starts landing. Thus, if the sample amplitude is lower than the said value, there is a taking-off operation (signal S1) and, if it is higher, there is a landing operationg (signal $\overline{S1}$).

The FIGS. 3 and 6 show the logic circuits in rectangle 27 of FIG. 4 which are designed for closing or opening the tracking loop when there occurs certain conditions. Only the logic circuits associated with the tracking 1 will be described in details, those of the tracking 2 being immediately deducible.

Logic conditions are provided so that the tracking loop 1 is immediately closed on a target detected in the D1 and D3, and is closed on a target detected in the zones D9 and D11 if, after a certain delay, that target has not been handled by the tracking loop 2. Furthermore, the tracking loop 1 is opened when the tracked target reaches DFP1 or DFP2 (FIG. 7) or when the tracked target stops when landing.

The tracking loop is closed in two steps; the first one consisting in moving the range gates to the range where a target has been detected, and the second one consisting in closing the loop if certain conditions are fulfilled, particularly if the range gates are centered on the target to be tracked. Thus, during the first step (FIG. 5), the range gates are moved to the zones D1, D3, D9 or D11 if, the loop being open (signal $\overline{B1}$), a target is detected in the said zones (one of signals OS1, OS3, OS9 or OS11) and if, in the case of the zones D9 and D11, the second tracking loop is already closed (signal RB2). The signal RB2 corresponds to the signal B2 (second loop closed) delayed by a time R so as to enable the other loop to have time to close on a target. So there is avoided the case of the two loops closing on a same target.

In FIG. 5, the signals d1, d3, d9 and d11 are the voltages which determine the initial positions of the range gates so that they include the target detected in one of these zones, which results in a signal OP1 at the output of the quotient circuit PQ1 (FIG. 4), said signal Op1 forming a condition of the loop closure as it will be shown in relation with FIG. 6. Outputs of the electronic gates P1-P4 of FIG. 5 respectively provide the voltage d'1, d'3, d'9 and d'11 when they are passing and a constant voltage when they are off.

In FIGS. 4, 5 and 6, the signal B1 means that the loop is closed on, i.e. that the switches 35 and 36 of FIG. 5 are open. Such a loop closing (FIG. 6) is obtained if, the loop being open (signal $\overline{B1}$), a target is detected either in the zones D1 or D3 (signal OS1 or OS3 being present), either in the zones D9 or D11 if the other tracking loop is already closed (conditions OS9, RB2 or OS11, RB2). However, the tracking loop 1 is really closed only if the target is detected in the range gates (signal OP1) and if the distance between the range gates of the two trackings is higher than a certain value (signal $\overline{Em}$).

The loop is opened (FIG. 6) if the tracked target goes beyond the distances DFP1 and DFP2 called runway end distances [condition DP1 DFP1 + DFP2] of if the tracked target has a zero speed (signal V1) and no longer produces a tracking signal OP1. The signals DFP1 and DFP2 are provided by the range gate generator 22 (FIG. 3) and each determines a range interval far enough from each runway end (500 to 1000 meters).

The signals OD1–OD11, D1–D11, a1–, a1+, V1, S1, a2–, A2+, V2 S2, Em as well as the signal S or $\overline{S}$ defining the runway utilization direction are applied to a circuit 24 which generates alarm signals and lamp lighting signals, the said signals being applied to a unit the front side of which is provided with a certain number of lamp indicators. For example, there are 26 lamps forming two groups, one having 11 lamps of green color VV1–VV11 corresponding to the range intervals, the other one including 15 red lamps VA1–VA15 corresponding to various alarm conditions.

A green lamp indicator is lighted when an obstacle is detected in the corresponding range interval. Thus, the green lamp VV1 is lighted when a signal OD1 occurs, i.e. when a moving target is entering the range interval D1, whether such target occurence is normal (plane occuring for taking off) or not (case of other vehicles.

A red lamp indicator is lighted when an abnormal event occurs, for example, detection of a moving obstacle in the range interval D4 when a plane is taking off or landing.

The following table gives a non limitative list of alarm signals A1–A15 their meanings and their logical occurence conditions. This table shows that the alarm signal A2, meaning that a landing in the direct direction is made before the runway beginning, is generated if one of the two tracking being in landing condition ($\overline{S1}$ - $\overline{S2}$), its speed becomes null (B1. V1 + B2. V2) and its range corresponds to the interval DO, [(DP1 + DP2) DO] when the landing is in the direct direction (S). By similarly reasoning, it will be understood how the signals A3–A7 are produced which correspond to various landing cases and how the signals A8 and A9 are produced which correspond to taking off wherein the tracking speed becomes null at a range Dec or D'ec too short with respect to the runway branch.

The alarm signals A10–A13 relate to tracking acceleration reversal depending on the runway utilization direction and plane operation; landing or taking off.

The alarm signal A14 occurs if targets are detected in the range intervals D1–D11, the said echoes being not otherwise tracked by the tracking range gates.

The alarm signal A15 occurs if echoes are detected in, at least, two of the four range intervals D1, D3, D9 and D11 including the taxiways.

The alarm signals A1–A15 light respectively the red lamps VA1–VA15 located on the unit housing front side, each lamp being accompanyied with its meaning.

The unit housing front side also includes two arrows in opposite direction to each other which, when lighted, determine the runway utilization direction; direct or reverse. Such a direction is put on by an operator and corresponds to signal S or $\overline{S}$. The alarm signals control lighting of lamp indicators VA1–VA15 via bistable circuits which can only be reset by an operator who operates a switch common to all bistable circuits or a switch per bistable circuit.

Green lamps are not controlled by bistable circuits, but their lighting durations correspond to logical condition duration.

When there is no movement on the runway and on its immediate vicinities, only the arrow sign indicating the runway utilization direction is lighted. If no tracking loop being closed, a target is detected in any one of the range intervals, the corresponding green lamp indicator is lighted as well as the red lamp VA14, but if two targets occur, for example, in the range intervals D1 and D3, the red lamp VA15 and the green ones VV1 and VV3 are lighted. Those two targets trigger the closing of the two tracking loops, the tracking 1 being closed on the target detected in D1 and the tracking 2 being closed after a delay R on the target detected in D3.

If the interval between the tracking ranges DP1 and DP2 respectively equal to D1 and D3 is too small, the red lamp VA1 is lighted. If it is assumed that the danger occuring by the two targets detected in D1 and D3 has been averted and that, for example, the target in D3 corresponds to a plane starting to run while the target in D1 has stopped, the green lamp VV3 is switched off. While the plane is passing through the range intervals, the corresponding green lamps will be switched on or off depending on the plane entering the interval or leaving it. If a target occurs in a range interval different of that one where the plane is at the same time, the red lamp VA14 is lighted and the green lamp corresponding to the interval where the target has occured is also lighted. If the taking off operation is normal, with no alarm A8–A13, the tracking is discontinued when the plane reaches the range DFP2.

In the hereabove description, it has been assumed that signals provided by the logical circuit 24 control lighting of the lamp indicators. However, they can be used for controlling occurence of symbols on a PPI screen.

TABLE 1

| Signal | Meaning | Logical conditions |
| --- | --- | --- |
| A1 | Distance between trackings lower than a certain value | $\overline{Em}.B1.B2$ |
| A2 | Landing in direct direction before runway beginning | $\dfrac{(\overline{S1}+\overline{S2})(B1.V1+B2.V2)(DP1+DP2)\ S.DO}{M}$ |
| A3 | Landing in reverse direction before runway beginning | $M.\overline{S}.D'O$ |
| A4 | Landing in direct direction after runway end | $M.S.D'O$ |
| A5 | Landing in reverse direction after runway end | $M.\overline{S}.DO$ |
| A6 | Landing in direct direction outside taxiways | $M.S.(\overline{D9}.\overline{D11})$ |
| A7 | Landing in reverse direction outside taxiways | $M.\overline{S}(\overline{D1}.\overline{D3})$ |

TABLE 1 – Continued

| Signal | Meaning | Logical conditions |
|---|---|---|
| A8 | Taking off, too short in direct direction | $\dfrac{(S1+S2)(B1.V1+B2.V2)(DP1+DP2)}{N}$ S.Dec |
| A9 | Taking off, too short in reverse direction | $\overline{N}.\overline{S}.D'ec$ |
| A10 | Tracking acceleration reversal, when landing | $\overline{S1}.a1+$ |
| A11 | Tracking 1 acceleration reversal, when taking off | $S1.a1-$ |
| A12 | Tracking 2 acceleration reversal, when landing | $\overline{S2}.a2+$ |
| A13 | Tracking 2 acceleration reversal, when taking off | $S2.a2-$ |
| A14 | Detection of one or several echoes in range intervals D1–D11 said echoes being not tracked. | $(\overline{B1}+\overline{B2}(DP1+DP2)(OD1.\overline{D1}+OD2.\overline{D2}\ldots+OD11.D11))$ |
| A15 | Simultaneous occurrence of echoes in two range intervals including runway branches. | $OD1(OD3+OD9+OD11)+OD3(OD9+OD11)+OD9.OD11$ |

While the present invention has been described in relation with a specific example of embodiment, it is clear that it is not limited to the said example and that it can be varied or modified without being beyond of the scope of the invention.

We claim:

1. An area surveillance device wherein sum and difference signals are provided by two aerials and sum and difference channel phase discriminators, comprising:

a plurality of pairs of range selectors, each selector pair processing sum and difference signals returned from a range interval;

a plurality of deviation computers coupled to said plurality of range selectors, each for receiving the output signals from one range selector pair and providing signals whose amplitude is proportional to the deviation between a moving target and the axis of said aerials along the runway;

a plurality of threshold circuits coupled to said plurality of deviation computers for receiving said deviation computer output signals;

means coupled to the outputs of said plurality of threshold circuits for range tracking said moving target;

means coupled to the outputs of said means for range tracking for generating speed signals and acceleration direction signals;

means coupled to said threshold circuits for generating alarm signals; and an alarm signal display unit.

2. An area surveillance device according to claim 1 wherein said means for tracking comprises:

a computer coupled to one of said plurality of pairs of range selectors for computing tracked target range with respect to an initial tracking point;

a range gate generator coupled to said one of said plurality of pairs of range selectors; and means coupled to said one of said plurality of pairs of range selectors; selectors for generating track start and track stop signals.

* * * * *